W. J. BAKER.
Corn-Planter.
No 28,142. Patented May 8, 1860.
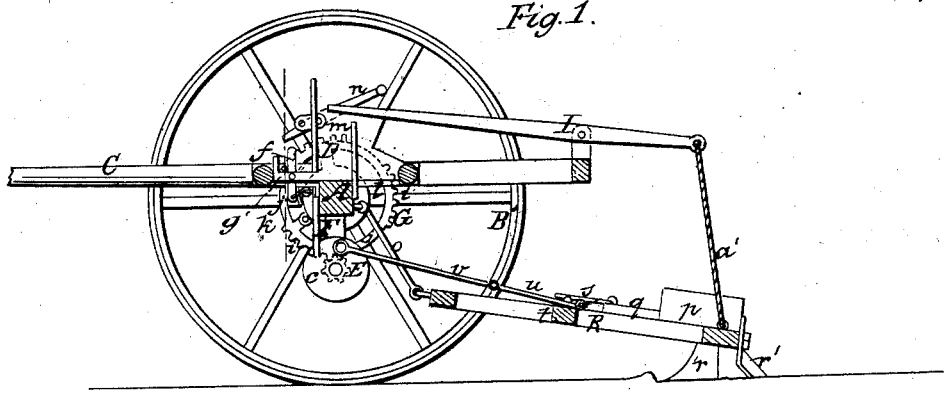
Fig. 1.
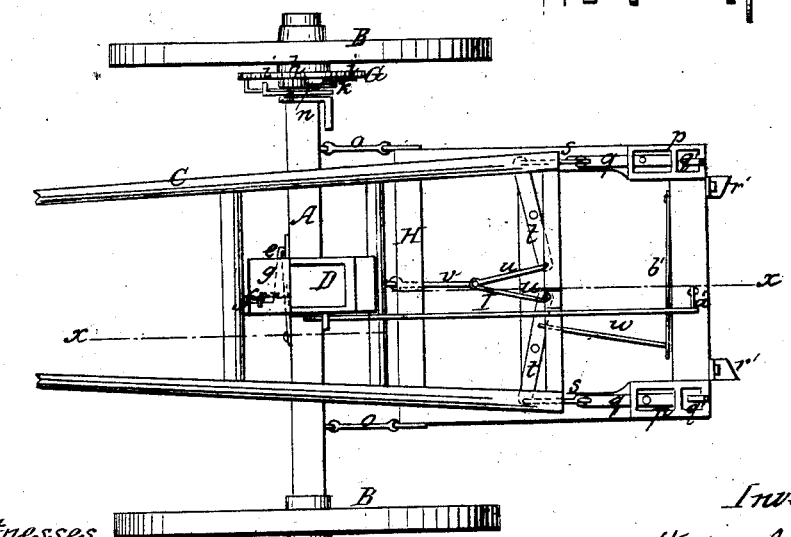
Fig. 2.
Fig. 3.
Witnesses
J. W. Coombs
R. S. Spencer
Inventor.
William J Baker
per Munn & Co Attys.

UNITED STATES PATENT OFFICE.

WILLIAM J. BAKER, OF DIMOCK, PENNSYLVANIA.

IMPROVEMENT IN SEEDING-MACHINES.

Specification forming part of Letters Patent No. 28,142, dated May 8, 1860.

*To all whom it may concern:*

Be it known that I, WILLIAM J. BAKER, of Dimock, in the county of Susquehanna and State of Pennsylvania, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a plan or top view of the same; Fig. 3, a detached front view of the driving-gear.

Similar letters of reference indicate corresponding parts in the several figures.

This invention relates to an improved seeding-machine of the class employed for planting seed in hills and in check-rows.

The object of this invention is to place the seed-distributing device under the complete control of the driver and insure the even planting of the seed in check-rows.

To enable those skilled in the art to fully understand and construct my invention, I will proceed to describe it.

A represents an axle, on the ends of which wheels B B' are placed loosely. In the axle A thills C are attached, and on the axle, at about its center, the driver's seat D is placed.

To the axle A two pendants, $a\ a$, are attached, the lower parts of which form bearings for a shaft, E, which has a pinion, $b$, at its outer end and a crank-pulley, $c$, at its inner end. The shaft E is allowed to slide longitudinally in its bearings, and it is prevented moving casually by means of a lever, F, which is secured to the axle A by a fulcrum-pin, $d$, and has its lower end forked and fitted over the edge of pulley $c$, the upper part of said lever being retained by a spring-catch, $e'$, which is connected to a lever, $f$, that may be operated by the foot of the driver, the lever $f$ extending up through the foot-board $g$, in front of the driver's seat.

To the inner end of the hub of the wheel B' a ratchet, $h$, is permanently secured, and on the arm of said wheel B a wheel, G, is placed loosely. The wheel G has its periphery divided into six equal parts, three alternate ones of which are toothed, as shown at $i$, the intermediate parts, $j$, being smooth. (See more particularly Fig. 1.)

To the wheel G a pawl, $k$, is secured, and this pawl engages with the ratchet $h$, causing, through the medium of the pawl, a rotation of wheel G with the wheel B' when the machine is moved forward, the wheel G being inoperative when the machine is moved backward.

At the end of the axle A, opposite wheel G, there is a circular plate, $l$, having an arm, $m$, attached.

To the outer end of arm $m$ there is pivoted a lever, $n$, which may be made, when necessary, to catch into wheel G, for the purpose hereinafter mentioned.

H represents a rectangular frame, the front end of which is suspended by rods $o$ from the axle A. On the back part of this frame H there are placed two seed-boxes, $p\ p$, one at each side, and a slide, $q$, is fitted in each box, and a yielding cut-off plate, $q'$. These slides are perforated and arranged like the ordinary reciprocating seed-slides in general use. Furrow-shares $r\ r$ are attached to the back part of the frame H, just below the seed-boxes $p\ p$, the discharge-openings for the seed being directly back of the shares, and covering-shares $r'$ are attached to the back part of the frame. The slides $q$ are connected by rods $s\ s$ to the outer ends of levers $t\ t$ on the frame H, and the inner ends of these levers are connected by rods $u\ u$ to a common rod, $v$, which is attached to the crank-pulley $c$.

The thills C extend some distance back of the axle A, and a lever, I, is attached thereto. The back end of the lever I is connected by a chain, $a'$, to the back part of the frame H, as shown clearly in Fig. 1. To one of the levers $t$ a rod, $w$, is attached, said rod being also attached to a spring, $b'$, at the back part of the frame H.

The operation is as follows: As the machine is drawn along motion is communicated from the wheel B' to the wheel G by means of the pawl and the pinion $b$ of shaft E, being adjusted directly under wheel G. An intermittingly-rotating movement will be given shaft E and the crank-pulley $c$ through the medium of the levers $t\ t$, and rods $s\ s$, $u\ u$, and $v$, and the spring $b'$ gives an intermittingly-reciprocating movement to the slides $q\ q$, which drop the seed at proper intervals from the seed-boxes $p\ p$, the seed falling into furrows made by the shares $r$ and covered by the shares $r'$.

The driver may at any time elevate the frame H by depressing the front end of lever I, so that the shares $r\ r'$ may pass over any obstructions that may lie in their path; and in order that the droppings at the end of rows may correspond, or an even commencement made in order to insure the hills being dropped in check-rows, the driver, by turning the wheel G through the medium of lever $n$, may cause the first droppings at the commencement of rows to be in line with those of previous rows, and thereby insure a proper distribution or dropping of the seed throughout the remainder of the rows. By having the frame H, containing the seed-boxes, and shares suspended to the axle, as shown, the seed-distributing device and shares are allowed to conform to the inequality of the surface of the ground.

When it is not desired to drop the seed as it passes over barren spots, or when the machine is being drawn from place to place, the shaft E is moved longitudinally, so that the pinion $b$ will be out of line or out of gear with wheel G, as shown in Fig. 3.

I do not claim the reciprocating seed-slides $q\ q$ for distributing the seed, nor the spring cut-off plates $g'$, for they or their equivalents have been used; but I do claim as new and desire to secure by Letters Patent—

1. The arrangement of the wheel G, having a toothed and blank periphery, spaced as described, the ratchet $h$, adjustable shaft E, provided with the pinion $b$, and the crank-pulley $c$, connected with the seed-slides $q$ through the medium of the levers $t\ t$ and rods $s\ s\ u\ u\ v$, and used in connection with the spring $b$, as and for the purpose set forth.

2. The frame H, provided with the seed-distributing devices, and furrows and covering-shares, when suspended to the axle A and used in connection with the mechanism employed for operating the seed-slides $q\ q$, as and for the purpose herein specified.

WM. J. BAKER.

Witnesses:
  E. B. GATES,
  L. E. GARLAND.